Nov. 6, 1951        G. W. DE BELL        2,573,693
MACHINE FOR MAKING HOLLOW PLASTIC ARTICLES
Filed Nov. 14, 1947        2 SHEETS—SHEET 1
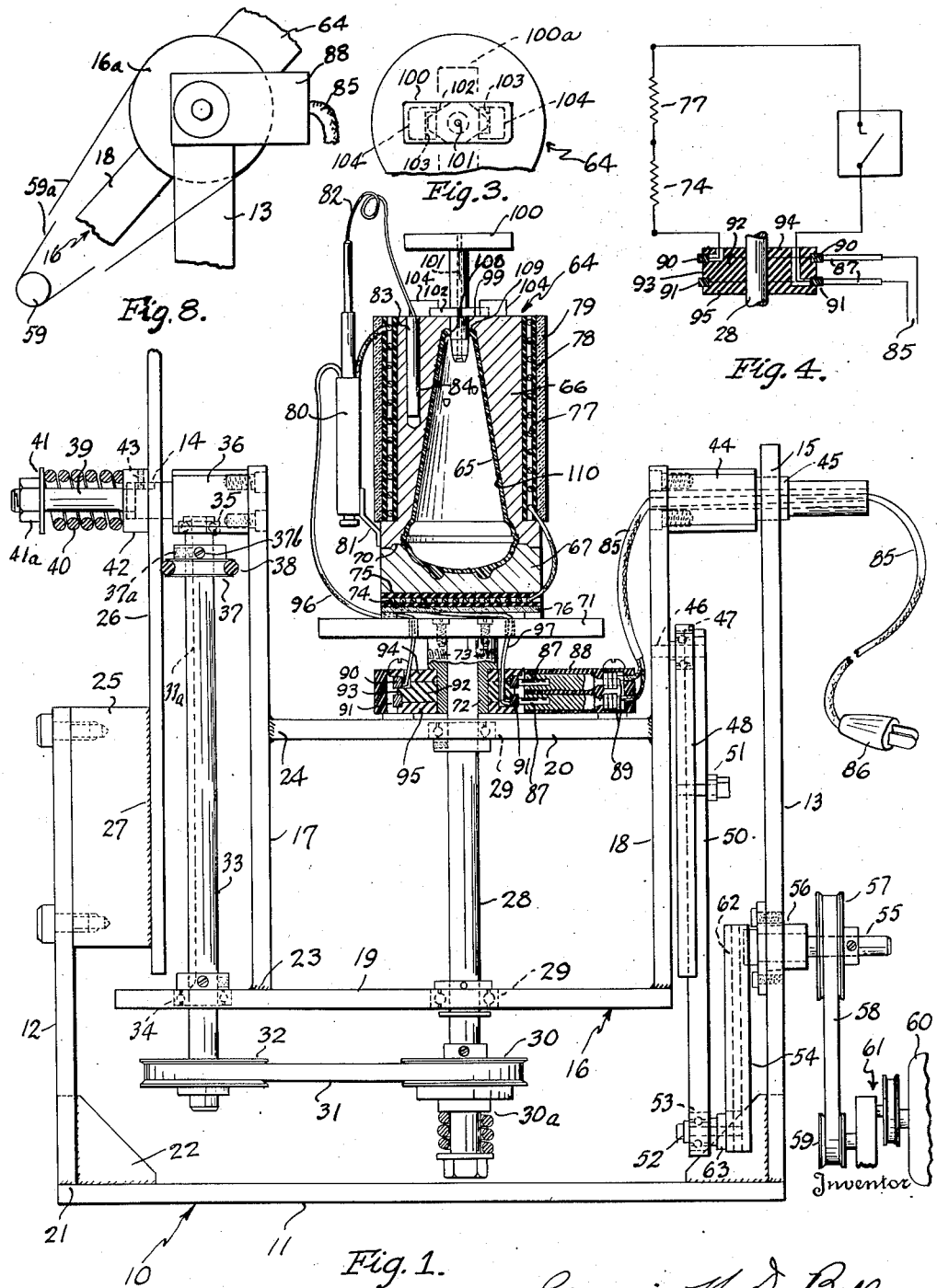

Nov. 6, 1951  G. W. DE BELL  2,573,693
MACHINE FOR MAKING HOLLOW PLASTIC ARTICLES
Filed Nov. 14, 1947  2 SHEETS—SHEET 2
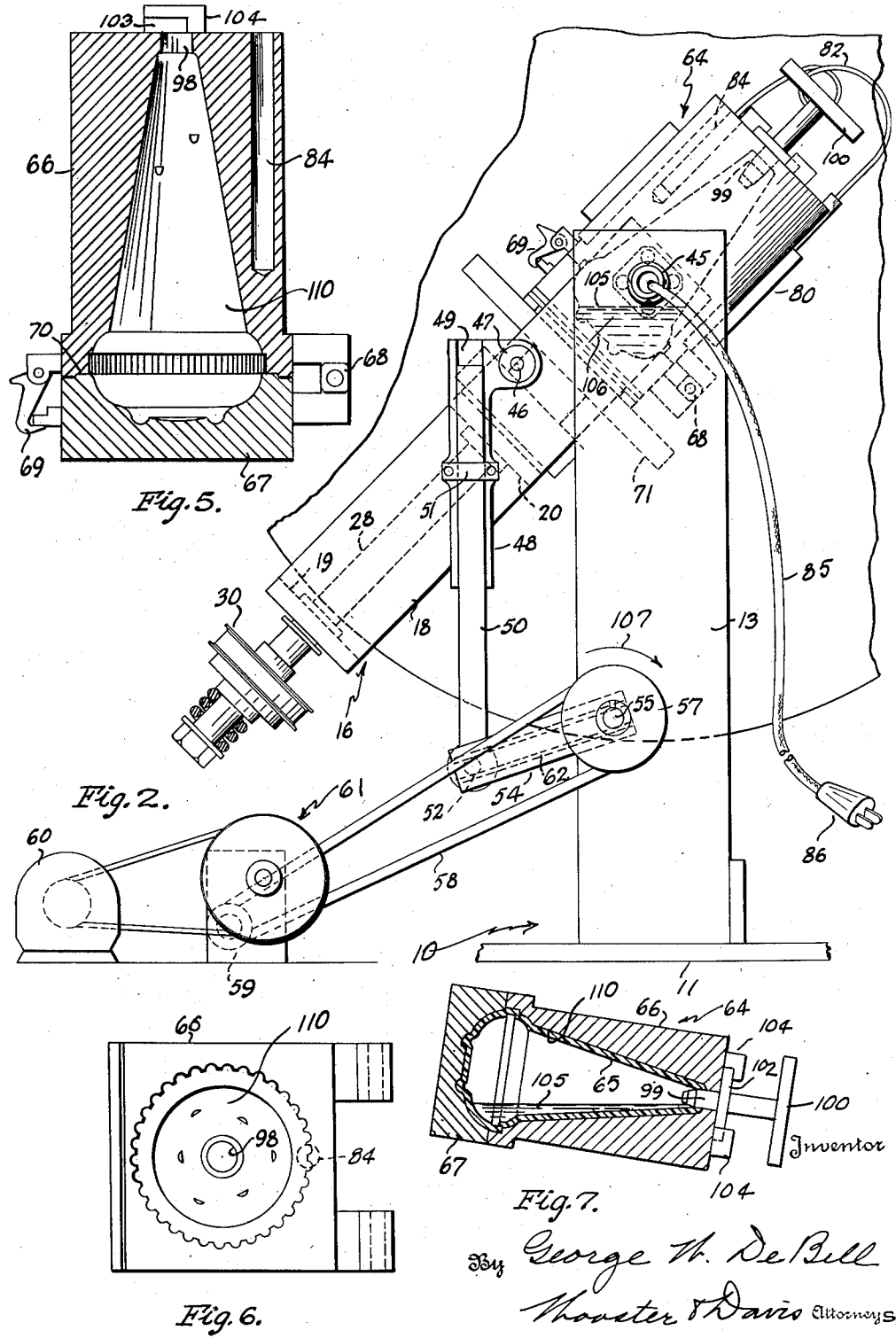

Patented Nov. 6, 1951

2,573,693

UNITED STATES PATENT OFFICE 2,573,693

MACHINE FOR MAKING HOLLOW PLASTIC ARTICLES

George W. De Bell, Stamford, Conn.

Application November 14, 1947, Serial No. 785,973

9 Claims. (Cl. 18—26)

1

This invention relates to molding of hollow bodies from plastic material, and has for an object to provide an improved machine whereby hollow plastic articles may be molded in one piece by pouring a measured amount of a relatively uncured thermosetting resin material into a mold maintained at a temperature sufficient to cure the resin, and the mold rocked or turned in a manner to insure that the uncured material contacts all desired surfaces of the mold, so that the heat of the mold will cure the resinous material on the mold surface, and of a wall thickness desired for the finished article.

It is also an object to provide a device in which a mold for forming articles of plastic material is both rocked about one axis and rotated about another axis, so that the unset plastic material may be made to cover all the desired surfaces of the mold for molding various shaped articles.

Another object is to provide a device by which a one-piece hollow plastic article, either in which the surfaces are re-entrant or there is an opening through the wall, as in a narrow mouthed bottle, for example, or an article in which the interior surface is wholly separated from the external surface and there is no opening, as in a hollow ball, for example, may be molded.

A still further object is to provide a device in which the operation of molding the article is substantially automatic after placing the desired amount or charge of the material into the mold cavity.

With the foregoing and other objects in view, I have devised the construction and arrangement illustrated in the accompanying drawings. It is, however, to be understood the invention is not limited to the specific construction and arrangement shown, but may embody various changes and modifications within the scope of the invention.

The method is claimed in my copending application filed of even date herewith, Serial No. 785,972.

In these drawings:

Fig. 1 is a front elevation of the machine with parts shown in section to more clearly show the construction and showing as an example a mold for molding plastic mutes for musical instruments;

Fig. 2 is a side view looking from the right of Fig. 1;

Fig. 3 is a top plan view showing a closure for the charging opening for the mold;

Fig. 4 is a wiring diagram for the heating units;

Fig. 5 is a longitudinal section of a mold used for molding mutes for musical instruments re-

2 moved from the machine and with the heating units omitted;

Fig. 6 is a bottom view of the top section of the mold;

Fig. 7 is a longitudinal section of the mold showing another position to which it may be shifted during the molding operation, and Fig. 8 is a diagrammatical view showing a modified drive arrangement.

Formerly in molding thermosetting plastic articles, such, for example, as a tapered or substantially cone-shaped mute for musical instruments, such as trumpets, they had to be assembled from two or more molded parts, and this entailed not only additional complication in molding, but also the problem of matching the parts to each other and assembling them. Sometimes such assemblies could be riveted or screwed together, or sometimes adhesives had to be used. With my improved machine and process, these and similar products can be completed in a single molding operation and in one piece, so that the operation of matching and assembling different parts is obviated. With this method and machine the articles may be made of higher grade or more costly raw materials and the differential in cost of the completed article offset by elimination of the assembling costs. Furthermore, as the article, in this case the musical mute, for example, is made in one unitary piece, there are no dry spots or looseness in any adhesive joint or other assembled connections, which would cause sound effects, as is often the case in assembled structures, as the mute is subjected to extremely high frequency vibrations.

Although the machine shown and the description are directed principally to molding thermosetting materials, it is to be understood it is not limited to use with these materials, but is also adapted for molding other molding materials, such, for example, as thermoplastic resins or materials, or metals or other moldable materials.

The embodiment of the machine shown comprises a base or stand 10 including a lower transverse connecting member 11 and laterally spaced upright side members 12 and 13. Mounted to oscillate or swing in suitable bearings 14 and 15, supported by the side members, is a substantially U-shaped frame 16 comprising spaced upright side members 17 and 18, a connecting lower member 19, and a connecting intermediate transverse member 20. The members 11, 12 and 13, may be assembled and connected by any suitable means, but preferably are welded as indicated at 21 and braced by corner members 22 welded to the other members. Similarly, the various members of the oscillating frame 16 may be assembled by any suitable means, but they are also preferably welded together, as indicated at 23 and 24.

Suitably mounted on the upright 12 by any suitable means, such as an intermediate block 25, is an upright circular disc 26 which may be secured to the block by welding, as shown at 27, and the bearing 14 for the oscillating frame 16 may be mounted at the center of this disc. The frame 16 carries a rotatable shaft 28 mounted to rotate in suitable bearings 29 in the cross members 19 and 20, and at its lower end is a driving pulley 30, preferably a V-pulley, operated by a V-belt 31 from a driving pulley 32 on a drive shaft 33 mounted in a suitable bearing 34 in an extension of the member 19, and a second bearing 35 mounted in an extension block 36 to which the upper end of the side member 17 is connected. The pulley 30 preferably drives shaft 28 through a friction clutch or drive 30a to permit turning of mold 64 independently of the shaft to the position most convenient for opening it. Mounted on this shaft is a friction drive pulley 37 provided with a frictional driving ring 38, such, for example, as a suitable fiber or rubber material running on the surface of the disc 26. The pulley 37 is adjustable longitudinally on the shaft 33 to vary its distance from block 36 and shaft 39 and thus vary the speed at which shaft 33 and thus shaft 28 and the mold 64 are driven. Pulley 37 may be splined to shaft 33 by a key or set screw 37a running in a longitudinal groove or key way 33a in the shaft, and secured in adjusted position by set screw 37b. The block 36 is mounted on a shaft 39 in the bearing 14, and the shaft is extended from plate 26 a sufficient distance for a coil spring 40 to embrace this shaft and at its outer end bearing against a suitable washer 41 on this shaft and at its inner end against a suitable block 42 at the outer side of the plate 26 and splined to the shaft, as indicated at 43, to turn with the shaft but permit the shaft to have longitudinal movement with respect to the block. With this arrangement the spring 40 tends to shift the shaft and the parts carried thereby to the left as viewed in Fig. 1, and thus always maintain the drive pulley 37 in proper frictional contact with the surface of the plate 26 for effective driving operation. The pressure of the spring and therefore the pressure of the pulley against the plate may be varied to suit conditions by means of the adjusting nut 41a.

The other upright member 18 is supported by a similar block 44 at its upper end secured to a hollow shaft 45 running in the bearing 15 and adapted for longitudinal movement in this bearing under action of the spring 40. Mounted on this side member 18 by means of a suitable stud 46 secured in this member and by means of a suitable bearing 47 is an arm 48 provided with a longitudinal channel 49 to adjustably receive a link 50 secured in the channel for longitudinal adjustable movement by any suitable means, such, for example, as a transverse clamping strap 51. This link 50 is connected at its opposite end to a crank pin 52 by any suitable bearing 53, and which crank pin is adjustable longitudinally in a crank 54 secured to a crank shaft 55 mounted in a suitable bearing 56 in the side member 13. On this shaft 55 is a pulley 57, preferably a V-pulley operated by any suitable means, such as a V-belt 58 from the drive pulley 59 of a suitable electric motor 60, the pulley 59 being driven from the motor by any suitable reducing gear train drive assembly 61, so that the shaft 55 is driven at considerably less speed than the speed of the motor. The crank pin 52 may be mounted by any suitable means for adjustment in the crank 54, but a satisfactory arrangement is to provide the crank with a longitudinal T-shaped slot 62 and mount the pin 52 in a suitably shaped block 63 slidable in this slot. It will be understood that by adjusting the link or bar 50 longitudinally in the member 48, the block 63 is also shifted in the crank 54, and the angular speed of oscillation of the frame 16, and also the amount or amplitude of this oscillation, may be varied as desired.

The mold for molding the article is mounted on the shaft 28, and it will be apparent that due to the rotary movement of this shaft in the frame 16 and the oscillatory or rocking movement of this frame, the mold will be given a combined rotary and oscillatory movement about different axes at right angles to each other. In the present illustration the mold 64 is the mold for molding a generally cone-shaped or tapered mute for a trumpet, shown in section at 65, but it is to be understood that a mold for this particular article is shown merely by way of example to illustrate the operation of this machine and the method of molding, and that molds for differently shaped or different types of articles may be used as desired. This mold for molding this particular article is made in two sections 66 and 67 hinged together at 68 on one side and connected at the opposite side by a suitable releasable catch 69. The dividing line 70 between the mold sections is on the largest diameter of the article to be molded, so that when the mold is opened by releasing the catch 69 and swinging the upper section about the hinge 68, the two sections may readily separate to release the molded article 65, and after the mold is opened the article may be readily removed from the mold. The pulley 30 preferably drives shaft 28 through a friction clutch or drive 30a to permit turning of the mold to a position most convenient for opening this mold. This mold is mounted on the shaft 28 above the transverse support 20 where it is readily accessible and free from interference with the operative elements of the machine. It is secured to the shaft by any suitable means, such, for example, as mounting it on the plate 71 secured to a sleeve 72 mounted on the shaft and secured thereto by any suitable means, such for example, as the set screws 73, the axis of the mold cavity being in alignment with the axis of the shaft 28. This particular article is circular in cross section at right angles to its axis, but the device and method is not limited to this type of article, as a large number of differently shaped articles may be molded by this machine and method.

Where thermosetting plastic materials are used for molding the article, heating means is provided for maintaining the temperature of the mold at the proper temperature for curing and setting this material. It is, however, to be understood the device is not limited to use for molding thermosetting materials, but may be used for molding other plastics or moldable materials, including metals. Thus, in the device illustrated, the lower or head section of the mold is heated to the proper temperature by an electric resistance heating unit 74 mounted in suitable insulating material 75 and separated from the mounting 71 by a layer of heat insulating material 76. Also the body of the upper section 66 of the mold is surrounded by a suitable electric resistance heating unit 77 in any suitable insulating material 78 and surrounded by heat insulating material 79. The operation of these two units is controlled by any suitable thermostatic control to maintain the temperature of the molds substantially constant and at the proper temperature for properly curing and setting the thermosetting material. For this purpose a suitable thermostatic control 80 is mounted on a side of the mold by any suitable means, such as the bracket 81, and connected by a capillary tube 82 through a thermostatic bulb 83 in a thermometer well 84 provided in a wall of the mold.

Current for the heating coils or units 74 and 77 is supplied by means of a lead cable 85 adapted to be connected by any suitable plug connection 86 to an electrical outlet of an electric wiring system, and passing through the hollow shaft 45 to a pair of brushes 87 mounted in a block 88 of insulating material mounted on the support 20 and provided with radial sockets in which these brushes are mounted and in which they are connected to the leads of the cable 85, as indicated at 89. These brushes contact laterally spaced and insulated slip rings 90 and 91 of suitable electrical conducting metal and mounted in a suitable insulating support mounted on the sleeve 72 so as to rotate with the shaft 28 and therefore with the mold. This support for the slip rings comprises an intermediate disc 92 of suitable insulating material, such as compressed fiber provided with a peripheral rib 93 on the opposite sides of which the slip rings are located. The rings are held in this position by the outer discs or plates 94 and 95 of insulating material on opposite sides of the center ring 92 and secured to it and to each other by any suitable means. Suitable lead wire connections 96 and 97 are connected with the respective slip rings and connected to the opposite ends of the heating elements 74 and 77 through the automatic control 80.

The thermosetting, thermoplastic or other plastic or molding material from which the article is to be molded is placed in the cavity of the mold after the mold is closed through an opening 98 in the outer or top end of the mold, and after the material is placed in the mold this cavity is closed by means of a suitable closure plug 99 operated by a suitable handle 100, the plug being provided with a small vent 101 to permit escape of gases from the mold formed incident to the molding operation, and prevent these gases building up pressure within the mold. This vent, however, is not always necessary. Also, although a single cavity mold is shown it will be understood a multiple cavity mold may be used. The plug is removably held in position by any suitable means. In the present construction it is provided with a transverse bar or plate 102 adapted by turning movement of the plug to slide at its opposite ends in notches 103 formed in lugs 104 on the top of the mold with the notches 103 opening in opposite directions, so that by turning the handle 100 and the bar 102 to the left, as shown in Fig. 3, to bring the handle to the dotted line position 100a, the ends of the bar 102 are removed from the notches 103, releasing the plug 99 so that it may be removed from the mold and may be reinserted to close the opening 98 by reverse operation. After the plug is removed, the proper measured amount of material may be deposited in the mold cavity by a suitable form of pressure gun (not shown) having a nozzle insertable through opening 98 and a plunger in the cylinder to force the material into the cavity in the mold. By means of such a gun the exact amount of material for molding each individual article is measured and deposited in the mold cavity. This operation, however, is performed preferably when the mold is in an inclined position, substantially as shown in Fig. 2, forming a puddle indicated at 105 in the lower portion of the mold cavity. The plug 99 may be omitted and the charge of material placed in the mold cavity while the mold is open before closing it. If a closed lower end is to be formed on the article, this puddle must be large enough so as to extend over the center point 106 or axis of the article being molded. Then after closing the filling opening 98, as the machine operates through rotation of the crank 54 by the motor, its movement being in the direction of the arrow 107, Fig. 2, the frame 16 will be oscillated to the right, or clockwise as viewed in Fig. 2, about the aligned axes of the shafts 39 and 45, this operation gradually tipping the upper or free end of the mold downwardly to any position desired, depending on the shape of the article being molded. In the present example of molding the conically shaped mute, it is tipped to substantially the position of Fig. 7, so that the pool or puddle 105 of the liquid thermosetting material has a chance to flow over all of the interior surfaces of the mold cavity 110 for the entire length thereof. During this oscillating or tipping movement of the frame 16, the friction drive pulley 37 running over the surface of the plate 26 is rotated and through the pulley drive 32, 31, 39 will rotate the shaft 28 and therefore rotate the mold about its longitudinal axis. This, therefore, carries the puddle 105 of molding material over the entire inner surface of the mold, causing it to cover this surface to the desired thickness for the thickness of the wall of the article 65 being molded, and which material is cured and set on these walls of the cavity by the heat from the heating units 74 and 77 in the mold.

It will, therefore, be understood that during the molding operation the plastic molding material is evenly distributed over the surfaces of the mold cavity by the combined oscillating or tipping action of the mold with the frame 16 and the rotary motion of the mold about its longitudinal axis caused by rotation of the shaft 28. During these movements of the mold the puddle 105 of the liquid plastic material remains in the lowest part of the mold cavity and spreads itself evenly over the mold surfaces by this combined oscillating and rotating motion. The mold may rotate in one direction only if desired, but in making a complete article best results are secured by rocking it over and back. The operation is about two intersecting axes, and it could be operated by continuous rotation in one direction or oscillation about these axes. A driving arrangement for continuous operation in one direction is shown diagrammatically in Fig. 8. In this arrangement a pulley 16a is connected to block 44 or directly to frame 16 carrying the mold 64 and its operating shaft 28, and connected by a suitable driving belt 59a with the driving pulley 59. In this case electric current would be supplied to the heating units for the mold by a slip ring and brush arrangement 88 the same as that shown in Fig. 1. If the mold is rotated in one direction only, the operation must be fast enough to turn it substantially upside down, or at least to its extreme position, as in Fig. 7, and back again before the material is entirely set. That is, the puddle must go the full length of the mold cavity and back again before the material at the starting end is sufficiently cured to prevent a permanent bond with the next outer layer. Also, the mold must make a complete turn before the puddle leaves any longitudinal portion of the mold cavity in order to cover the complete peripheral surface of the mold cavity. It will also be seen that one rotation, that is, the rotation about the longitudinal axis, is sufficiently faster than the other or the oscillating movement so that the puddle makes a continuous layer or wall by an overlapping spiral, and this is repeated by the reverse oscillating movement before the material at the lower end or original puddle hardens sufficiently so as not to bond with the next layer. On the other hand, both rotations must be sufficiently slow not to develop a centrifugal force greater than the pull of gravity, so that the puddle will remain at the lower side of the cavity and follow around and cover all the surfaces of the mold cavity and not be collected at the largest diameter, as it would in the case of centrifugal action. In molding an article, such, for example, as the article 65 in the present example, in which an opening 108 is desired in one end, the plug 99 is made long enough to extend into the mold beyond the thickness of the wall of the article, as shown in Fig. 1, but if a closed end is desired with no opening, then the closure plug 99 would be made only long enough to come at its inner end to a position flush with the end wall 109, and the plug in this case would not be vented. This same procedure would be used in molding such articles as a hollow ball, for example, with continuous walls and no opening. It is not necessary that the axis of the mold be on the axis of the shaft 28, as the necessary rotation can be secured by planetary movement of the mold about the axis of the shaft.

Various plastic material can be molded in this machine. The articles in the example shown have been molded by a thermosetting material comprising a polyester resin with suitable accelerators and also fillers, such, for example, as fiber glass, asbestos, or other suitable fibrous material to increase the strength of the molded article and also to reduce the amount of the more expensive plastic or resinous material and thus reduce the cost of the article, but the amount of filler should not be sufficient to interfere with the proper molding action. The thermosetting action is a polymerization. A mixture which has been used comprises a mixture of two monomers which are changed to polymers with exothermic reaction. A material which has been used and found very satisfactory is a mixture of polyester resinous materials; for example, about 50% each of resins sold on the market as "Plaskon 960–11" and "Plaskon 920–11," the first being quite flexible and the second less flexible, the mixture of the two giving a resin of the proper strength and flexibility.

In other words, the material is a thermosetting contact pressure plastic resin, that is a polyester contact pressure resin, say of 100 parts, with an accelerator for the resin as required by the manufacturer of from 2 to 4%, depending on the time desired for the setting. These are usually oxidizing agents, such, for example, as benzoyl peroxide. A contact pressure setting resin is one that is capable of curing satisfactorily at atmospheric pressure by the application of heat. With 100 parts of resin, the specified amount of catalyst and oxidizer should be used, as specified by the manufacturer. Color pigments may also be used. One and one-half per cent has been used for white and one-half per cent for black. Filler may be glass fiber flock, asbestos, or other suitable fibers. The filler should be an amount which will not prevent the puddle of the material properly flowing around the surface of the mold cavity. In other words, as much flock or filler may be used as can be added without increasing the viscosity at molding temperature to the point where the puddle will not remain at the bottom of the mold cavity during rotation of the mold. The filler is not essential, but has been used in these articles to increase the mechanical strength of the particular resin used. Also a coating may be used to prevent bubbling at the surface, so as to produce a smooth continuous surface. A small amount of the same resin could be used with about 50% of accelerator with no filler in this coating. Also, an antifoam or wetting agent might be used to lower viscosity and reduce foaming and increase the wetting properties. A parting agent or mold lubricant could also be used applied to the surface of the mold cavity before placing the molding material in it to insure that the plastic molding material will not stick to the surface of the mold. A so-called mold release fluid is available on the market under the name "Vejin," or a silicon base product may be used for the same purpose.

It will be seen from the above by this device and method articles of various shapes may be molded as a unitary structure in one piece from thermosetting or other types of plastics. It is not limited to use with thermosetting plastics, but may be used with cold setting or other types of plastics. As the article is molded in one unitary piece there are no separate pieces to be assembled and there are no joints between the sections to become separated or loosened. Also the article can be completed in a single molding operation, eliminating assembling costs. Articles may be molded either with an opening to the interior of the hollow article, as in a bottle, for example, or the hollow article can be molded in one piece without any opening, as a hollow ball, for example, providing such articles without a seam or joint of any kind.

Having thus set forth the nature of my invention, I claim:

1. A machine for molding hollow articles comprising a base, a frame mounted on the base for turning movement in an upright plane about a stationary horizontal axis, a mold mounted on the frame, cooperating means on the base and frame for rotating the mold about an axis running through the mold at substantially right angles to the axis of movement of the frame and operated by turning movement of the frame, and drive means connected to the frame to positively drive the frame a partial revolution first in one direction and then in the other to rotate the mold first in one direction and then in the other during the molding operation.

2. A machine for molding hollow articles comprising a shaft, a mold mounted on the shaft with the axis of the shaft running through the mold, driving means to swing the shaft first in one direction a partial revolution in the plane of the shaft and then a partial revolution in the opposite direction, and a driving connection between the first driving means and the shaft operable by swinging movements of the shaft to rotate the shaft and mold about their axes as the shaft is so swung back and forth to rotate the mold first in one direction and then in the other during swinging movement of the shaft.

3. A machine for molding hollow articles comprising a mold having a cavity of the size and shape of the article to be molded, means mounting the mold for rotation about an axis running through the mold, means mounting the mold for turning movement about a stationary axis at substantially right angles to the first axis by movement of the first axis in the plane of this axis, driving means for turning the mold first at least a partial rotation in one direction about the stationary axis and then at least a partial rotation about this axis in the other direction, and a driving connection from the driving means to the mold operable by movement of the mold about the stationary axis to turn the mold about the first axis first in one direction and then the other as the mold is swung about the stationary axis.

4. A machine for molding hollow articles comprising a mold having a cavity of the size and shape of the article to be molded, a base support, a frame mounted in the support to turn about a horizontal axis, a shaft mounted in the frame to rotate about an axis at substantially right angles to the first axis, means mounting the mold on the shaft with the axis of the shaft running through the mold, driving means for oscillating the frame to swing it about the horizontal axis first in one direction a partial revolution and then in the other direction a partial revolution, and a driving connection from the base to the shaft operable by swinging movement of the frame to rotate the shaft and mold first in one direction and then in the other about the axis of the shaft.

5. A machine for molding hollow articles comprising a mold having a cavity of the size and shape of the article to be molded, a support, a frame, means mounting the frame in the support to turn about a fixed axis, a shaft, means mounting the shaft in the frame to turn about an axis at substantially right angles to the first axis, means mounting the mold on the shaft with the axis of the shaft running through the mold, means for oscillating the frame about the first axis to turn it first in one direction and then the other, and means operated by turning movements of the frame to turn the shaft and mold first in one direction and then the other during movements of the frame.

6. A machine for molding hollow articles comprising a mold having a cavity of the size and shape of the article to be molded, a support, a frame, means mounting the frame to turn about a substantially horizontal axis, a shaft mounted in the frame to turn about an axis at substantially right angles to the first axis, means mounting the mold on the shaft with the axis of the shaft extending through the mold, an upright plate, a friction wheel carried by the frame and running on the plate, means for turning the frame about the first axis with the shaft axis moving in the plane of this axis comprising a rotatable crank mounted in the support, an adjustable link connecting the crank with the frame to oscillate the frame about the first axis, and a driving connection from the wheel to the shaft to operate the shaft by turning movements of the frame.

7. A machine for molding hollow articles comprising a mold having a cavity of the size and shape of the article to be molded, a support, a frame, means mounting the frame in the support to turn about a horizontal axis, a shaft mounted in the frame to rotate about an axis at substantially right angles to the first axis, means mounting the mold on the shaft with the axis of the shaft extending through the mold, an upright plate mounted in the support, a friction wheel mounted in the frame and running on said plate during movements of the frame, a crank mounted in the support and connected to the frame for operating it, power means for operating the crank, and a driving connection from the friction wheel to the shaft for operating the shaft during movement of the frame and including means whereby the position of the wheel may be adjusted radially of the first axis to vary the speed of operation of the shaft.

8. A machine for molding hollow articles comprising a mold having a cavity of the size and shape of the article to be molded, said mold being provided with an opening leading to the cavity for insertion of a measured charge of molding material to form a puddle at the lower part of the mold cavity, a plug for closing said opening and provided with a vent passage, means for detachably securing the plug in the opening, said mold comprising separable sections, heating means for the mold sections, means for simultaneously turning the mold about different axes at substantially right angles to each other to flow the puddle over the surface of the cavity, one of said axes extending through the mold cavity and movable about the other axis in the plane of the movable axis, said driving means for the mold including a support, a frame mounted for turning movements in the support, a rotatable crank mounted in the support, a driving link connecting the crank and frame to oscillate the frame by turning movements of the crank, a driving connection from the support to the shaft operating by swinging movements of the frame to turn the shaft about its axis as the frame oscillates, and means for supplying heating medium to the heating means during said movements of the mold.

9. A machine for molding a hollow article comprising a mold provided with an oblong cavity of the size and shape of the article to be molded, said mold being provided with a charging opening in one end for insertion of a charge of molding material to form a puddle in the lower part of the mold, a plug for closing said opening, means for detachably securing the plug in the opening, means mounting the mold to rotate about the longitudinal axis of the cavity, means mounting the mold to turn about an axis at substantially right angles to the first axis by movement of the first axis in the plane of this axis, and means for simultaneously rotating and turning the mold about said axes comprising means for oscillating the mold in opposite directions about the second axis, and means operable by oscillating movement of the mold to rotate the mold about the first axis in opposite directions as the mold oscillates, to flow the puddle over the surface of the cavity during setting of the material.

GEORGE W. DE BELL.

REFERENCES CITED

The following references are of record in the file of this patent:

UNITED STATES PATENTS

| Number | Name | Date |
| --- | --- | --- |
| 803,799 | Voelke | Nov. 7, 1905 |
| 1,784,686 | Fauerbach | Dec. 9, 1930 |
| 1,995,977 | Gonda | Mar. 26, 1935 |
| 2,222,266 | Rubissow | Nov. 19, 1940 |
| 2,466,277 | Rubissow | Apr. 5, 1949 |